United States Patent

Jan

[19]

[11] Patent Number: 5,832,657
[45] Date of Patent: Nov. 10, 1998

[54] ULTRASONIC EXPELLING DEVICE WITH INFRARED RAYS DETECTING CIRCUIT FOR DRIVING AWAY ANIMALS

[76] Inventor: Te Chin Jan, 24F-1, No. 161, Sung-Teh Rd., Taipei, Taiwan

[21] Appl. No.: 772,388

[22] Filed: Dec. 23, 1996

[51] Int. Cl.[6] ............................................. A01M 1/20
[52] U.S. Cl. .................................... 43/124; 116/22 A
[58] Field of Search ........................... 43/107, 112, 124; 116/22 A

[56] References Cited

U.S. PATENT DOCUMENTS

| | | | |
|---|---|---|---|
| 3,879,702 | 4/1975 | Mancone | 43/124 X |
| 4,215,429 | 7/1980 | Riach | 116/22 A X |
| 4,366,562 | 12/1982 | McGinty | 43/124 A X |
| 4,566,085 | 1/1986 | Weinberg | 116/22 A X |
| 4,709,151 | 11/1987 | Guscott et al. | 250/342 |
| 5,205,066 | 4/1993 | Jan | 116/22 A X |
| 5,425,192 | 6/1995 | Negre | 43/1 |
| 5,473,836 | 12/1995 | Liu | 115/22 A X |

*Primary Examiner*—Joseph J. Hail, III
*Assistant Examiner*—Anthony Ojini
*Attorney, Agent, or Firm*—W. Wayne Liauh

[57] ABSTRACT

An infrared ray detection and ultrasonic wave oscillation animal chaser includes a front case, a shell, a water-resistant cover, an infrared ray detection circuit board and an ultrasonic wave oscillation circuit board. The front case, shell and the cover have latching hook and grooves, and engaging rails and slots to enable them to be assembled or disassembled easily and quickly. The infrared ray detection circuit board and the ultrasonic wave oscillation circuit board are housed in the front case and the shell, and can sense and detect the infrared ray emitted from animals, and then emits high frequency ultrasonic wave to expel intruding animals away. The ultrasonic expelling device is powered by a battery set and therefore can be conveniently hung on an outdoor wall or incorperated with an adjustable strut at a suitable height enable to be located on the ground near the protected area.

1 Claim, 5 Drawing Sheets

ULTRASONIC EXPELLING DEVICE WITH INFRARED RAYS DETECTING CIRCUIT FOR DRIVING AWAY ANIMALS

BACKGROUND OF THE INVENTION

1. Field of the Invention

The present invention relates to an ultrasonic expelling device for driving away animals, and more particularly to an ultrasonic expelling device with an infrared rays detecting circuit capable of detecting animals within an effective detecting distance and then automatically actuating the expelling device to drive away the animals.

2. Description of the Prior Art

Abandoned animals such as cats and dogs roving around the residence area becomes an annoying problem to many households. They often rummage trash bins, spoil gardens, discharge dungs and create environment pollution. Some households try to keep the unwanted animals away by setting up fence. It usually costs a lot of money and impairs the visual beauty of the house. Some other households try to install ultrasonic wave animal chaser to expel the roving animals away. Conventional ultrasonic wave animal chaser (as shown in FIG. 1) is usually hung on a post or wall and being powered continuously by electricity. It can only be installed at a limited scope of areas, and thus is not effective enough to meet the requirement of animal chasing. It addition, it also consumes a lot of power and energy.

SUMMARY OF THE INVENTION

In view of the aforesaid disadvantages, it is an object of this invention to provide an infrared ray detection and ultrasonic wave animal chaser which can cover a wide scope of area and can automatically trigger the operation of emitting ultrasonic waves to expel the intruding animal away. It is therefore more effective and can also save energy. The present invention has advantages of easy installation, low power consumption, and removable feature.

It is another object of this invention to provide an animal chaser which is compact, versatile and highly portable. The structure includes rails and slots, latching hooks and grooves, and can be assembled or disassembled easily. It has a water-resistant cover to prevent main unit from rain. It also has an adjustable strut to enable it to be installed at different height desired. Thus, the invention can be installed on the ground with the strut or simply be hung on the outdoor wall.

BRIEF DESCRIPTION OF THE DRAWINGS

The invention, as well as its advantages, may be further understood by the following detailed description and drawings in which.

DETAILED DESCRIPTION OF THE PREFERRED EMBODIMENT

Figure 1:
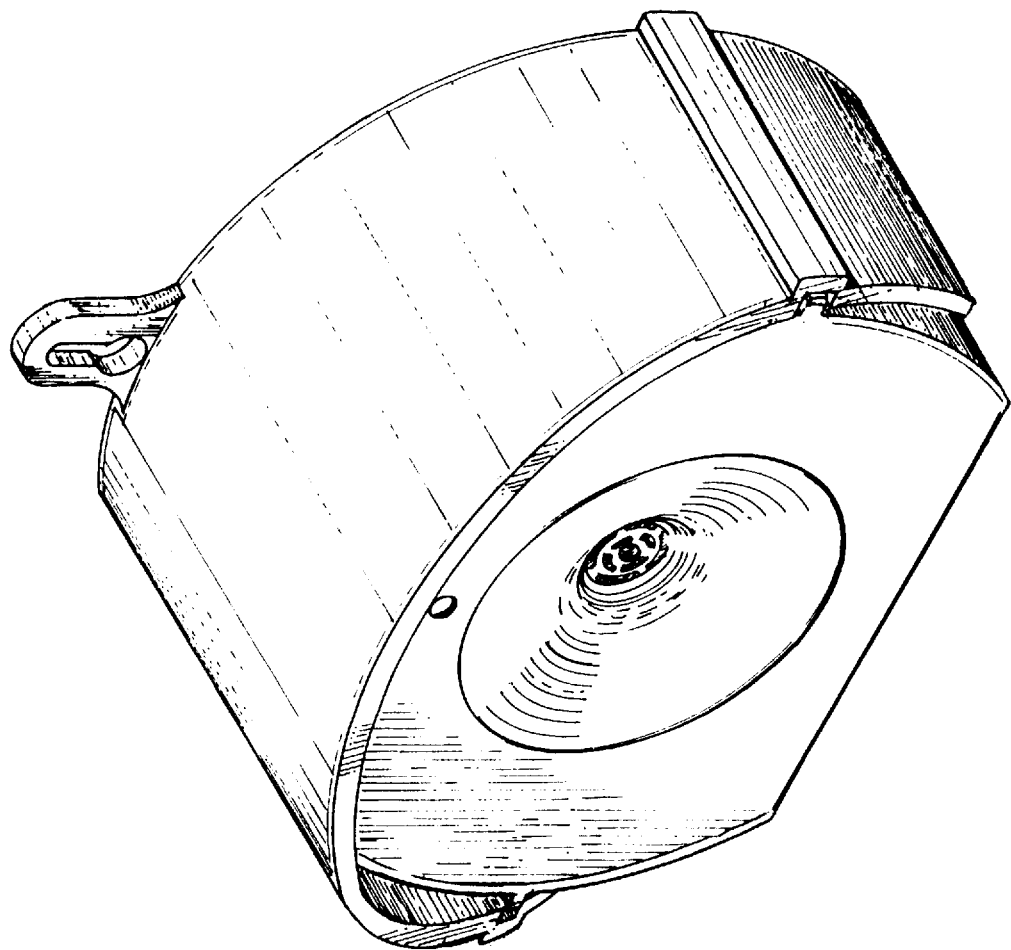
FIG. 1 is a perspective view of a conventional animal expelling device.
Figure 2:
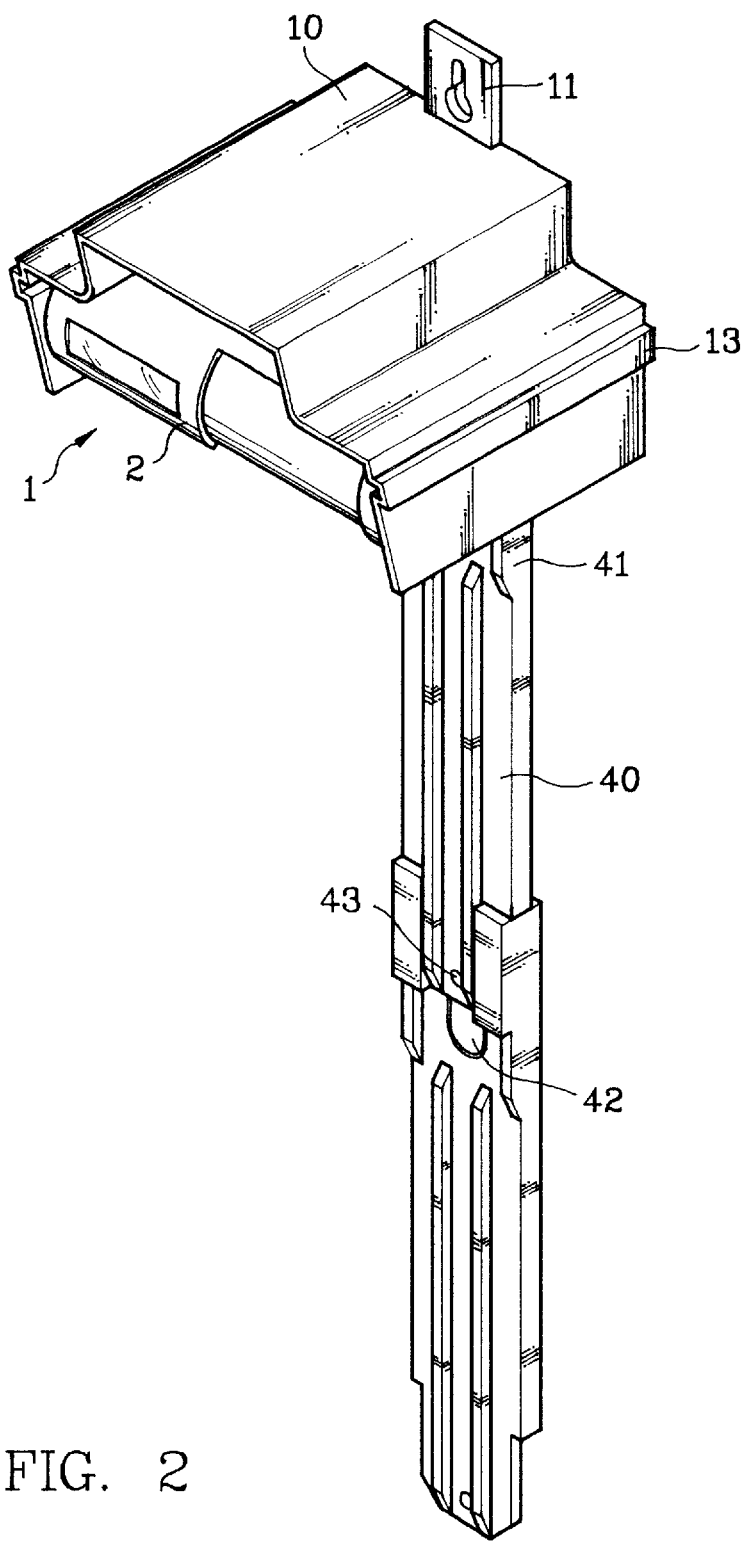
FIG. 2 is a perspective view of this invention.
Figure 3:
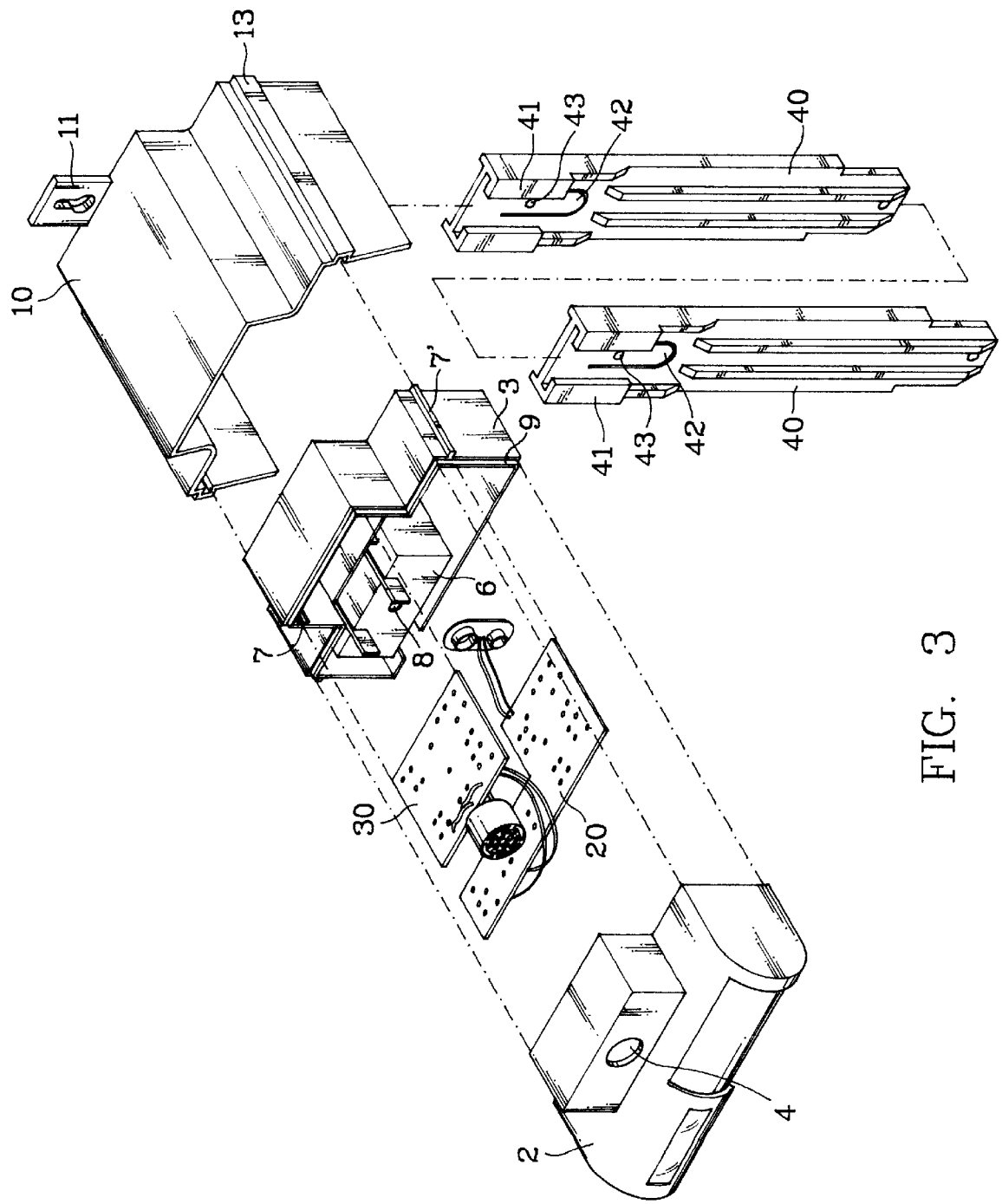
FIG. 3 is an exploded view of this invention.

Referring to FIGS. 2 and 3, this invention includes a case 1, a cover 10, an infrared ray detection circuit board 20 (herein after called IRDC board 20), an ultrasonic wave oscillation circuit board 30 (hereinafter called UWOC board 30) and a connection strut 40. The case 1 is a substantially rectangular box consisting of a front case 2 and a shell 3. The front case 2 is a protrusive and hollow body with a screw seat located inside and a center opening 4 in its upper end. There are two pairs of slots located on the two inside lateral walls of the front case 2 for holding the IRDC board 20 and the UWOC board 30 respectively.

The shell 3 is also formed in protrusive shape to mate and engage with the front case 2. Inside the shell 3, there is a battery chamber 6 for holding battery to power the whole device. In the inside lateral walls of the shell 3, there are also two pairs of slots 7" and 7 for holding the IRDC board 20 and UWOC board 30, respectively. The shell 3 is provided with two rails 7' on both outer side walls thereof. The connecting edges of the shell 3 and the front case 2 have latching grooves 9 and hooks (not shown in the figures) to enable the front case 2 and the shell 3 be easily engaged and assembled together. The battery chamber 6 has an aperture 8 to enable a screw to fix the shell 3 to the front case 2 on the screw seat located thereof to form the case 1.

The cover 10 is formed in a protrusive hollow shape and is water-resistant with a pair of third slots 13 on two lateral walls for engaging with two rails 7' formed on the lateral walls of the shell 3. The cover 10 thus shields the front case 2 and the shell 3 (as shown in FIG. 2) against rain water when this invention is located outdoors. On a rear end of the cover 10, there is provided with a second hook 11 for hanging of the device. Under the cover 10, there is a connection board for engaging with the strut 40.

The strut 40 includes a pair spaced guiding slots 41 formed at one end, a spring tongue 42 and a stud 43 formed on the spring tongue. Another end of the strut 40 is taper with a second aperture formed therein and can be inserted into the guiding slots 41 of another strut (as shown in FIG. 2) with the stud 43 of another strut engaging with the second aperture. The stud 43 and the spring tongue 42 will hold the connecting struts securely in position. Thus two or more struts may be connected to form different heights of a final strut, and to hold the cover 10, and the shell 3 at different height desired. Pressing the spring tongue 42, the connected struts 40 can be separated easily and quickly for disassembly.

Based on the structure set forth above, it can be seen that the engagement, connection and assembly of the front case 2, shell 3, cover 10 and strut 40 mainly use latching grooves 9, hooks, rails 7', slots 13, connection board, guiding slots 41 and the spring tongue 42. The assembly or disassembly can be done simply and quickly with little use of hand tools.

Figure 4:
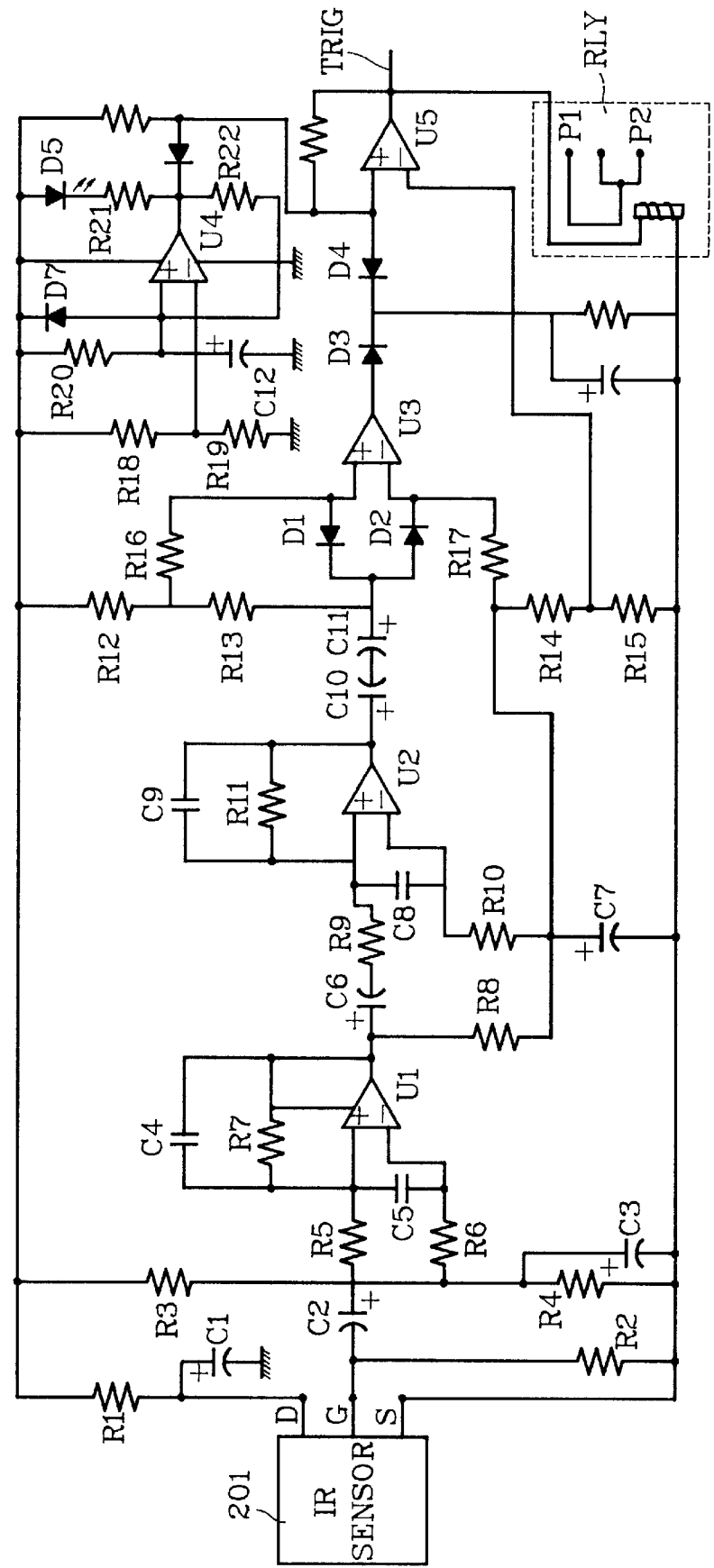
FIG. 4 is a schematic circuit diagram of the infrared rays detecting circuit of the present invention.

FIG. 4 is a schematic circuit diagram of the infrared rays detecting circuit in accordance with a preferred embodiment of the present invention. The detecting circuit includes an infrared rays detecting sensor 201 (IR sensor) capable of sensing infrared rays generated by animals, human body, or other heat sources within an effective detection pattern. The output signal of the IR sensor 201 is sent to the non-inverted input of an operational amplifier U1 via a DC current isolated capacitor C2 and a resistor R5.

A voltage dividing circuit composed of resistors R3 and R4 connected in series form is used to provide with a reference voltage to the inverted input of the operational amplifier U1 via a resistor R6. A capacitor C3 is further connected to the resistor R4 in parallel to supply a more stable reference voltage for the voltage dividing circuit.

The operational amplifier U1, resistors R5, R6, R7, capacitors C4, and C5 commonly serve as a first amplifying circuit and band-past filter for the IR sensor 201. It is noted that a proper gain of the first amplifying circuit may be determined by the resistors R5 and R7.

In addition, a resistor R1 and a capacitor C1 form a current limiting and noise filtering circuit which is coupled to the terminal D of the IR sensor 201 to reduce the noise signal of the IR sensor 201. A resistor R2 is coupled between the terminals G and S of the IR sensor 201 in parallel connection for resistance matching purpose.

The output signal of the operational amplifier U1 is supplied to a second amplifying circuit for further amplifying the signal of the IR sensor. The second amplifying circuit is composed of a second operational amplifier U2, capacitors C5, C9, C7, resistors R8, R9, R10, and R11. Thereafter, the output signal of the second operational amplifier U2 is supplied to a known window comparator via two capacitors C10 and C11 connected in series.

The window comparator circuit is composed of a comparator U3, resistors R12, R13, R16, R17, R14, R15, diodes D1, D2, and D3. The reverted input terminal of the comparator U3 is interconnected to a node between the resistor R10 and the capacitor C7 via the resistor R17 so as to obtain a stable DC voltage level. In such an arrangement, the output signal of the comparator U3 is in a form of positive output signal constantly.

Preferably, a power-on time delay circuit is employed to provide a proper time delay when a power source is supplied to the expelling device of the present invention. The power on delay circuit is composed of a comparator U4, resistors R18, R19, R20, a capacitor C12, and a diode D7. An indicator D5 with resistors R21 and R22 is coupled to the output terminal of the comparator U4 for indicating the operation situation of the present invention.

A comparator U5 is employed to compare the output signal of the window comparator U3 via a diode D4 and a reference signal level provided by a reference signal supplying circuit composed of the resistors R14 and R15. The output signal TRIG of the comparator U5 is used to energize a relay RLY provided with a normally closed contact P1 and a normally open contact P2. Once the relay RLY is energized, the expelling device of the present invention will be actuated to generate ultrasonic wave to drive away animals. At the same time, the triggering signal TRIG generated by the comparator U5 is sent to the ultrasonic wave generating circuit which will be described below.

Figure 5:
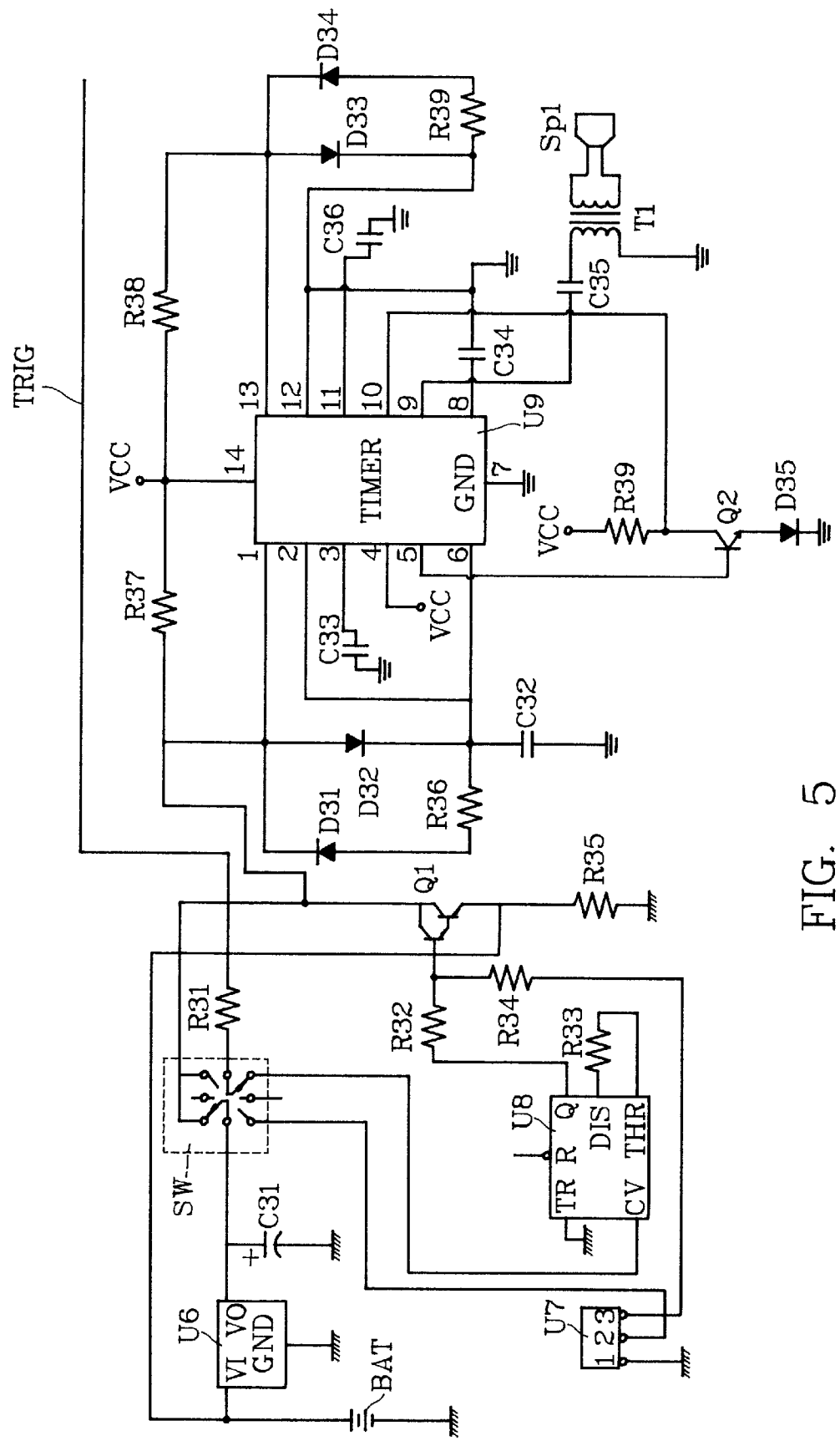
FIG. 5 is a schematic circuit diagram of the ultrasonic wave generating circuit of the present invention.

With reference to FIG. 5, it is a schematic circuit diagram of the ultrasonic wave generating circuit of the present invention, which is composed of an intermittent signal generating circuit 100 and an astable oscillator circuit 101 for converting the triggering signal TRIG into ultrasonic wave. The intermittent signal generating circuit mainly includes a first timer U8, resistors R32, R33, R34, R35, and a transistor Q1. The triggering signal TRIG from the infrared rays detecting circuit as shown in FIG. 4 is first supplied to the first timer U8 via a resistor R31 and a manual control switch SW. In such an arrangement, the first timer U8 may be enable in responsive to the triggering signal TRIG. The output terminal Q of the first timer U8 may control the transistor Q1 via the resistor R32 to generate an intermittent output signal at the collector of the transistor Q1.

A voltage regulator U6 with a capacitor C31 is capable of regulating the DC power source for a battery BAT and then supplying a regulated voltage to the ultrasonic wave generating circuit. In addition, a connector U7 is connected between the switch SW and the base of the transistor Q1 via a resistor R34, which may be further electrically connected to another manual control switch (not shown), so that the user may control the switch to actuate the ultrasonic wave generating circuit to generate ultrasonic wave in a manual control manner.

The ultrasonic wave generating circuit described above includes an astable oscillator circuit composed of a second timer U9, resistors R 36 through R39, capacitors C32 through C34, diodes D31 through D35 and a transistor Q2. The intermittent output signal generated from the intermittent signal generating circuit described above is transmitted to the power source terminal Vcc of the second timer U9, serving as an enable signal source of the second timer U9. That is, once the second timer U9 receives the intermittent output signal, the second timer U9 will begin to oscillate and therefore the ultrasonic wave generating circuit will generate an oscillating output signal at ultrasonic frequency at its output terminal. An ultrasonic wave transducer SP1 may be actuated by the output signal of the timer U9 via a transformer T1 and a capacitor C35.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An ultrasonic expelling device for driving away animals, comprising:

a front case formed in protrusive hollow shape with a rear opening having a screw seat inside, a circular opening at a top front end, two pairs of first slots on the inside walls of two lateral sides, and a latching groove on the rear edge;

a shell formed in protrusive hollow shape with a front opening mating with the rear opening of the front case, provided with a power supply chamber inside, two pairs of second slots on the inside surface of two lateral walls, a pair of rails located respectively on two outside surfaces of the two lateral walls, and a latch hook on a front edge for engaging with the latching groove of the front case to form a case;

a waterproof cover in protrusive hollow shape located above the case having a protrusive second hook in a rear wall for hanging, a connection board at the bottom, and a pair of third slots on the two lateral inside walls for engaging with the rails of the shell;

a strut shaped in an elongated channel for connecting with the connection board at one end thereof, provided with a pair of spaced and longitudinal guiding slots at one end, a spring tongue in the center between the guiding slots, with a stud formed thereon and a taper bottom end with an aperture formed therein for engaging with the stud of another strut;

an infrared ray detection circuit board held between a pair of the first slots and a pair of the second slots including an electricity input terminal connecting with the power supply chamber, a power on indicator for showing operative status and an infrared ray detection circuit for sensing the infrared rays emitted by animals and sending a triggering signal;

an ultrasonic wave oscillation circuit board held between another pair of the first slots and another pair of the second slots including an intermittent signal generating circuit and an astable multi-oscillator for converting the triggering signal into an intermittent ultrasonic wave oscillation frequency.

* * * * *